Patented Oct. 29, 1940

2,219,929

UNITED STATES PATENT OFFICE 2,219,929

LUMINESCENT SCREEN

Henry W. Kaufmann, East Orange, N. J., assignor to Radio Corporation of America, a corporation of Delaware No Drawing. Application May 10, 1938, Serial No. 207,011

2 Claims. (Cl. 250—81)

This invention relates to luminescent screens, and in particular, to cathode luminescent screens suitable for use in cathode ray tubes as well as for use in conjunction with X-ray in which it is desired to produce substantially white light from the luminescent material when irradiated by the activating energy.

It is highly desirable in building cathode ray tubes to provide a luminescent screen which shall give white light when impacted by electrons, especially when such tubes are used in television receivers for reproducing pictures. This arises from the psychological fact that we are accustomed to black and white pictures as well as the physiological fact that eye strain is reduced in viewing black and white pictures, in contradistinction to monochromatic pictures. Single luminescent materials, however, which will give white light under such conditions, have not yet been produced which have the requisite degree of efficiency, stability, and workability, so that it is necessary to resort to mixtures of luminescent materials which have complementary spectral emission so that under bombardment of the cathode ray, the overall response of the mixture approaches white light. Such a combination which has been used is silver activated zinc cadmium sulphide and blue luminescent zinc sulphide.

The silver activated zinc sulphide luminesces blue, while the activated zinc cadmium sulphide luminesces yellow under cathode ray bombardment, and by appropriate selection of proportions of the blue and yellow luminescent sulphides, an approximately white light can be obtained under bombardment by electrons. However, this mixture has very serious drawbacks. In the first place, the yellow luminescent zinc cadmium sulphide is easily injured in its luminescent properties by contamination with impurities during processing or by baking at necessarily high temperatures during the exhausting of the tube, or by both. Furthermore, in use, the yellow luminescent zinc cadmium sulphide deteriorates very rapidly under bombardment, particularly as often happens, when ions are produced within the tube. Likewise, the efficiency of light produced by the yellow luminescent sulphide measured in candle powers by watt of exciting energy is quite different from that of the blue luminescent zinc sulphide, and further, the yellow luminescent sulphide changes its efficiency rapidly with bombardment so that the prepared screen does not have stable white light emission characteristics, as well as possessing a very short overall life.

It has been proposed, therefore, to overcome the deleterious effects of short life and changing spectral emission characteristics to use luminescent materials prepared from oxides, but such screens generally have very low efficiencies, and accordingly, leaves much to be desired where the images formed on the end wall of a cathode ray tube, as for receiving television pictures, must be necessarily bright to enable viewing in a room in which some light is present.

It is the purpose of this invention, therefore, and the main object thereof, to produce an improved luminescent screen capable of emitting substantially white light with excellent efficiencies, long life, and substantially invariant spectral emission qualities.

In accordance with this invention, I make use of blue luminescent zinc sulphide mixed with an appropriate proportion of yellow luminescent material prepared from compounds of oxides, one of the preferred materials being manganese activated zinc beryllium silicate. A screen prepared from the mixture of either pure zinc sulphide or silver activated zinc sulphide with manganese activated zinc beryllium silicate, produces a screen which has an efficiency of approximately 1.75 candle powers per watt, a life of at least one thousand hours and with substantially white light.

The other advantages attending such a mixture of materials is the fact that the blue luminescent zinc sulphide is relatively stable, unaffected by processing temperatures, has long life, and is not easily injured. The same is true of the manganese activated zinc beryllium silicate with the further attendant advantage that the luminous efficiency of the silicate is substantially the same as that of the blue luminescent zinc sulphide.

A further advantage arises from the use of manganese activated zinc beryllium silicate as the material furnishing the complementary light to the blue zinc sulphide, and that is that the silicate is very stable both in its physical and chemical properties and is substantially impervious to disintegration under cathode ray bombardment. Materials other than the sulphide and this silicate which might be used to provide the yellow light, have the disadvantages of disintegrating under cathode ray bombardment and releasing chemicals which "poison" the blue sulphide to destroy its luminescent efficiency and in some cases, to destroy its luminescent properties entirely. By using manganese activated zinc beryllium silicate, no disintegration takes place so that the blue luminescent zinc sulphide or silver activated zinc sulphide cannot be "poisoned" and this aids in contributing long life to the screen.

A further advantage which arises from the mixture of blue luminescent zinc sulphide and activated beryllium zinc silicate is the fact that the proportion of these materials may be varied over a fairly wide extent and still yield white light. This is of particular importance in the manufacturing of the individual luminescent materials, as well as in the preparation of the final screen. The blue luminescence may be controlled by varying the amount of silver used in activating the zinc sulphide, and since in general, it is rather difficult to control exactly the spectral emission of the zinc sulphide, the fact that the spectral emission of the manganese activated zinc beryllium silicate can be controlled by variation of the proportion of zinc, beryllium, manganese, and the silicate, enables the preparation of a silicate which can always afford complementary spectral emission to the blue luminescent zinc sulphide, regardless of the fact that there is a variation in the spectral emission of the blue sulphide from batch to batch.

Screens have been prepared from a mixture of these two materials, which mixture has a composition of from 20% manganese activated zinc beryllium silicate to 80% of this material, while the blue luminescent zinc sulphide constituted from 80% to 20%. The actual preparation of the screen may be performed in any of the methods well known in the art, such as preparing a suspension of each of the two materials, mixing the two suspensions, and pouring the mixture into the cathode-ray tube or the container wherein the screen is to be formed. By allowing the suspension to stand without movement, the materials gradually settle out to form the screen, after which the supernatant liquid may be decanted and the tube dried so as to be ready for further processing by addition of electron guns, electrodes, and the like. Alternatively, the silicate and sulphide may be mixed with an appropriate binder and sprayed on the supporting surface to form the screen. Following the spraying the screen may be heated to drive off or decompose the binder, whereupon the screen is ready for further processing as indicated above.

In accordance with the invention, I have found that the preferred proportion and material to be used in preparing the screen are 20% of silver activated zinc sulphide, and 80% of manganese activated zinc beryllium silicate.

It will thus be readily apparent that the mixture of blue luminescent zinc sulphide and beryllium zinc silicate offers a new and improved screen having great utility because of its high luminous efficiency, its invariant spectral emission of white light and long life.

Having described my invention, what I claim is:

1. A luminescent screen comprising a mixture of blue luminescent zinc sulphide and yellow luminescent zinc beryllium silicate wherein the ratio of the blue luminescent zinc sulphide to the yellow luminescent zinc beryllium silicate has a value substantially within the limits of ¼ to 4.

2. A luminescent screen consisting of substantially 20% of silver activated zinc sulphide and 80% of manganese activated zinc beryllium silicate.

HENRY W. KAUFMANN.